United States Patent [19]

Hiroshi

[11] Patent Number: 5,794,132
[45] Date of Patent: Aug. 11, 1998

[54] WIRELESS COMMUNICATION SYSTEM INCLUDING DIGITAL DATA SIGNAL TRANSMISSION CONTROL

[75] Inventor: Ishii Hiroshi, Tokyo, Japan

[73] Assignee: Funai Electric Engineering Company Limited, Tokyo, Japan

[21] Appl. No.: 492,227

[22] Filed: Jun. 19, 1995

[30] Foreign Application Priority Data

Jun. 21, 1994 [JP] Japan ................. 6-162601

[51] Int. Cl.$^6$ ........................ H04B 1/04
[52] U.S. Cl. .................. 455/127; 455/116; 375/297
[58] Field of Search ................ 455/115, 116, 455/127, 343, 67.1, 126, 117; 375/297, 312

[56] References Cited

U.S. PATENT DOCUMENTS

| | | | |
|---|---|---|---|
| 4,755,773 | 7/1988 | Ohmagari | 375/297 |
| 4,969,180 | 11/1990 | Watterson et al. | 455/74 |
| 5,033,111 | 7/1991 | Marui | 455/127 |
| 5,287,555 | 2/1994 | Wilson et al. | 455/126 |

FOREIGN PATENT DOCUMENTS

| | | |
|---|---|---|
| 0159131 | 10/1982 | Japan. |
| 4025225 | 1/1992 | Japan. |
| 40533595 | 12/1993 | Japan. |

*Primary Examiner*—Chi H. Pham
*Attorney, Agent, or Firm*—Dellett and Walters

[57] ABSTRACT

The present invention relates to a wireless communication system which suppresses the quantity of an electric power of a carrier wave consumed in communicating by a digital data as well as it can improve the communication quality. The wireless communication system according to the present invention includes at least a signal processing circuit section and a high frequency transmitter/receiver section and it comprises controlling the timing of modulation completion by the digital data signal with the transmitting timing of the modulation carrier wave supplied from the electric power amplification section of the high frequency transmitter/receiver section and a control circuit which controls the operation of the high frequency transmitter/receiver section in transmitting the modulation carrier wave on the basis of the preceded timing of the modulation completion.

1 Claim, 2 Drawing Sheets

WIRELESS COMMUNICATION SYSTEM INCLUDING DIGITAL DATA SIGNAL TRANSMISSION CONTROL

BACKGROUND OF THE INVENTION

1. Field of Invention

The present invention relates generally to a wireless communication system, which can not only suppress the electric power consumption of a carrier wave but also improve communication quality in a data communication.

2. Prior Art

In the conventional wireless communication system, e.g., a portable wireless telephone system, a carrier wave is modulated by an audio signal before being connected to a telephone line by way of wireless stations in the telephone network. In most recent years, not only audio signals but also data signals stored in memories in personal computers and the like are transmitted by the wireless communication system. In data communication, such data signals are connected to the telephone line by way of wireless stations similar to the audio signals. It is to be noted here that a carrier wave modulated by a digital data signal or an audio signal is collectively referred to as a modulated carrier wave in this specification.

In such wireless communication system, especially, when transmitting such digital data, a digital data signal may contain lower frequency components close to DC (direct current) as compared with audio signals, thereby requiring to modulate such lower frequency components. Modulation of such digital data signal is performed by supplying the digital data signal to be transmitted to a modulation circuit in the same manner as modulation of audio signals. Simultaneously, a PLL (phase-locked loop) circuit is actuated to generate a carrier signal locked to a reference signal for mixing with the digital data signal.

Unfortunately, problems associated with a wireless communication system for performing such modulation includes increased power consumption when transmitting the digital data signal. Another problem is communication quality due to increased error rate in the received data at the receiving end.

Primary causes of these problems include the fact that digital data signals contain lower frequency components close to direct current as compared with audio signals, thereby requiring longer time to complete the modulation (For example, a 34 Hz modulation signal in digital data communication requires approximately 30 ms). This means that only carrier signal unmodulated by the digital data signal to be transmitted is power amplified and transmitted from an antenna. In other words, power is wasted by transmitting only the carrier wave which does not contain any digital data signal, thereby increasing unnecessary power consumption in the wireless communication system. Additionally, the carrier wave unmodulated by a digital data signal is considered as the transmitted digital data signal at the receiving end, thereby increasing the error rate of the received data.

SUMMARY OF INVENTION

The wireless communication system according to the present invention intends to solve the above mentioned problems.

In particular, it is the object of the present invention to provide a wireless communication system capable of improving quality of communication in transmitting a digital data signal and also suppressing power consumption.

For this end, the wireless communication system according to the present invention comprises at least a signal processing section and a high frequency transmitter/receiver section for transmitting and receiving the modulated carrier wave which is modulated by an audio signal or a digital data signal. It features the provision of a control circuit for controlling the operation of the high frequency transmitter/receiver section when transmitting the modulated carrier wave by prioritizing the timing of completion of modulation at least by the digital data signal with respect to the transmission timing of the modulated carrier wave from a power amplifier in the high frequency transmitter/receiver section.

BRIEF DESCRIPTION OF DRAWINGS

FIG. 3 shows waveforms illustrating the operation of the control circuit as shown in FIG. 2.

DESCRIPTION OF EMBODIMENT

Figure 1:
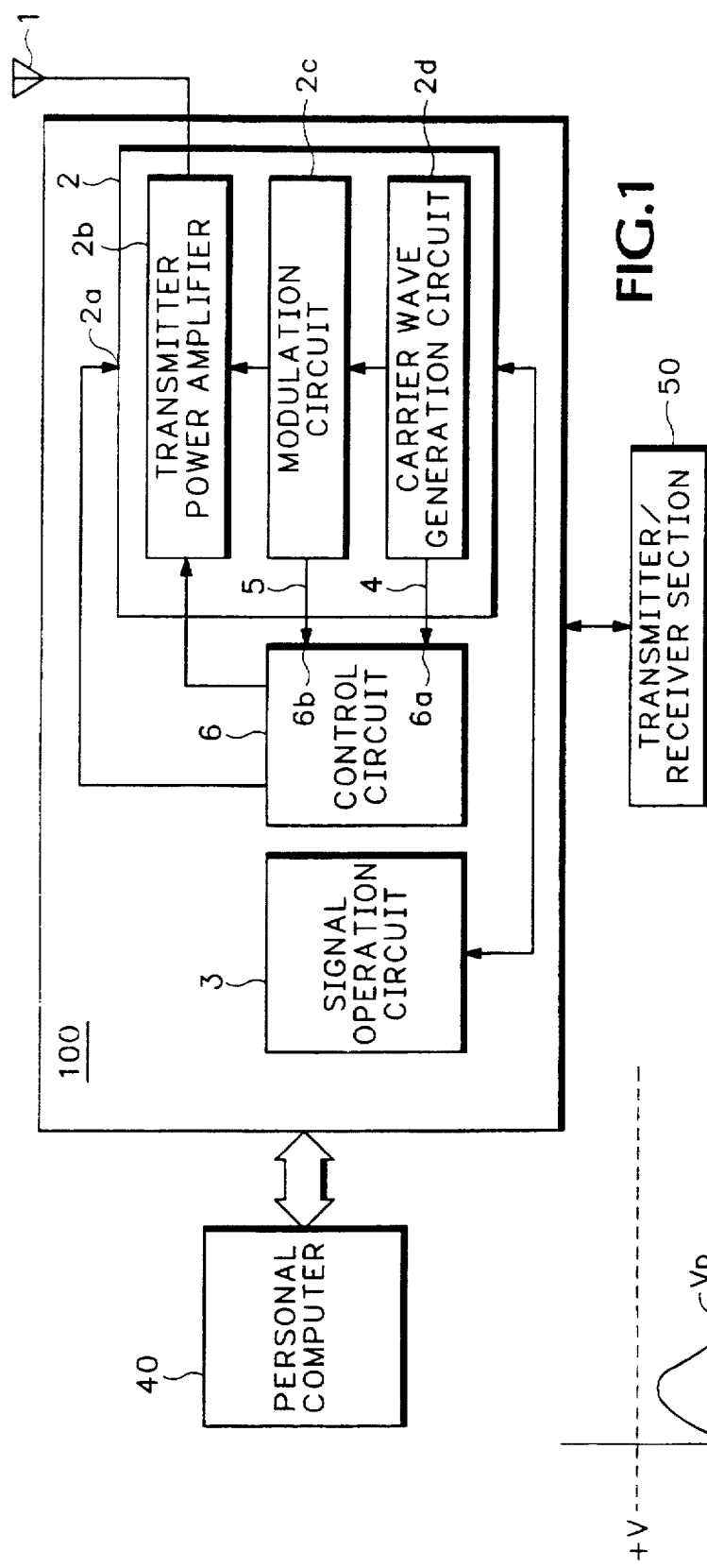
FIG. 1 is a block diagram of a embodiment of the wireless communication system according to the present invention.

As shown in FIG. 1, a wireless communication system 100 is operationally coupled to a personal computer 40 and a transmitter/receiver 50. A digital data signal from the personal computer 40 or an audio signal from the transmitter/receiver 50 is used to modulate a carrier wave and audio or data communication is performed by connecting the modulated carrier wave to a telephone line by way of wireless stations (not shown).

The wireless communication system 100 comprises an antenna 1 to receive a modulated carrier wave transmitted from wireless stations or transmit a modulated carrier wave to wireless stations, an RF transmitter/receiver section 2 for demodulating the modulated carrier wave received by the antenna 1 or generating a modulated carrier wave to be sent to the antenna 1, a signal processing circuit 3 for processing audio signals from the transmitter/receiver 50 or data signals from the personal computer 40, or for processing audio/data signals demodulated by the RF transmitter/receiver section 2, and a control circuit 6 for transmitting or receiving timing control signals for the RF transmitter/receiver section 2.

The RF transmitter/receiver section 2 comprises a carrier wave generation circuit 2d, a modulation circuit 2c for modulating a carrier wave generated from the carrier wave generation circuit 2d by audio/digital signals from the signal processing circuit 3, and a transmitter power amplifier 2b for amplifying the modulated carrier wave from the modulation circuit 2c.

The carrier wave generation circuit 2d provides to an input terminal 6a of the control circuit 6 a carrier wave enabling signal 4 to indicate that the carrier wave is ready to output. Also, the modulation circuit 2c provides to an input terminal 6b of the control circuit a modulation start signal 5 which is generated on completion of modulation of the digital data signal to be transmitted.

On the other hand, the control circuit 6 controls to supply a power supply voltage from a power terminal 2a to the RF transmitter/receiver section 2 and also to supply a power supply voltage from a power voltage 2f to the transmitter power amplifier 2b.

Figure 2:
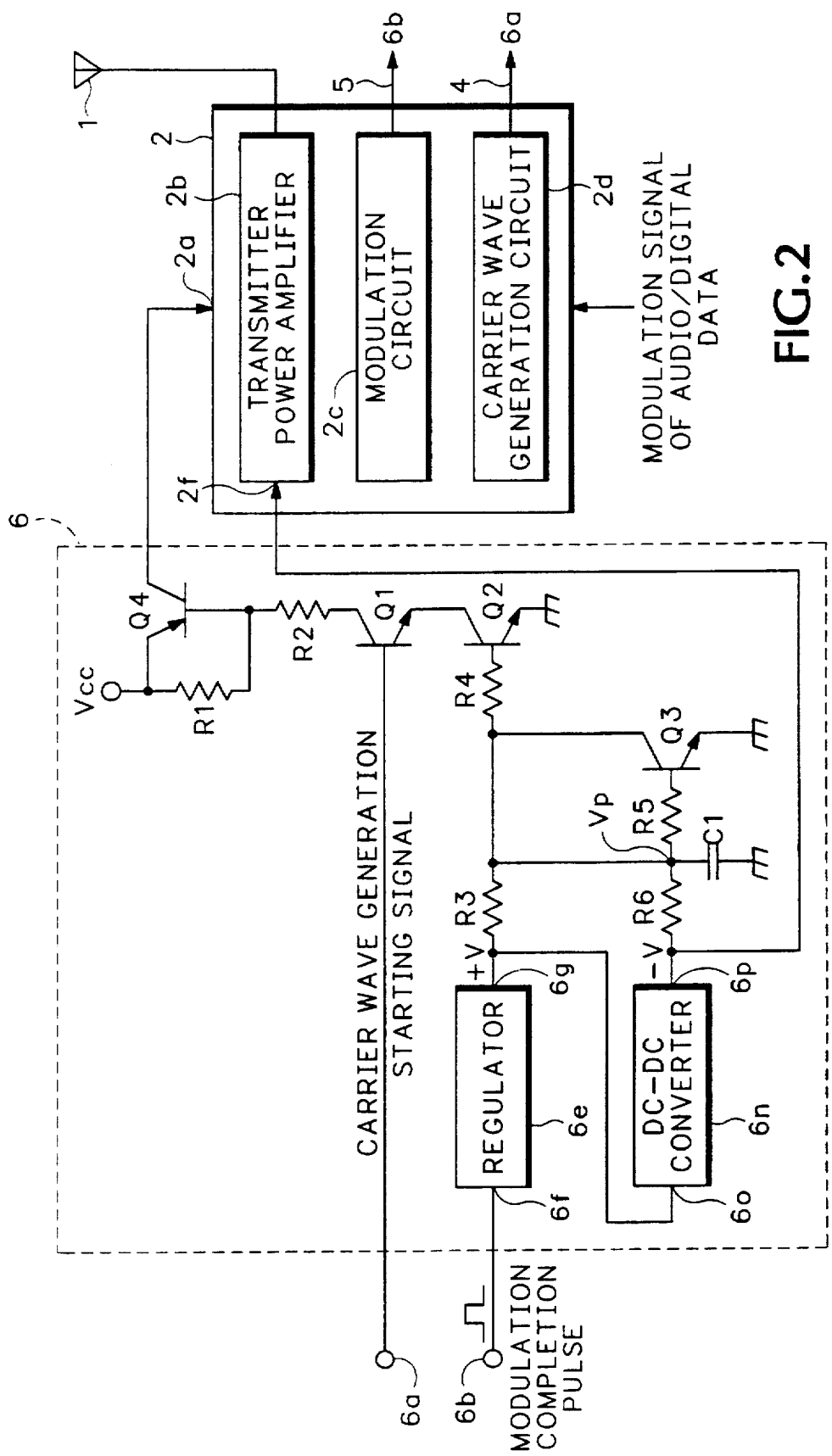
FIG. 2 is a circuit schematic of a control circuit to be used in the wireless communication system as shown in FIG. 1.

Now, the control circuit 6 will be described in detail. The control circuit 6 prioritizes the modulation completion timing of the digital data signal over the timing of transmitting the modulated carrier wave from the transmitter power amplifier 2b, so that the modulated carrier wave is transmitted based on the prioritized timing. Illustrated in FIG. 2 are a detailed circuit schematic of the control circuit 6 and a connection relationship with the RF transmitter/receiver section 2. It is to be noted here that similar circuits to those in FIG. 1 are represented by like reference numerals and descriptions of such circuits will be excluded.

The control circuit 6 comprises the input terminal 6a to which the carrier wave enabling signal 4 is applied, the input terminal 6b to which the modulation start signal 5 is applied, a transistor Q1 having the base electrode coupled to the input terminal 6a, a regulator 6e to which the modulation start signal 5 is applied from the input terminal 6b, and a DC-to-DC converter 6n coupled to an output terminal 6g of the regulator 6e.

The regulator 6e provides the voltage +V on its output terminal when the modulation start signal 5 is applied to the input terminal 6f. The output voltage +V is applied to an input terminal 6o of the DC-to-DC converter 6n, a series circuit of resistors R3–R4, and also the modulator. When the voltage +V is applied to the input terminal 6o, the DC-to-DC converter 6n outputs the voltage −V on its output terminal 6p.

The series circuit of the resistors R3–R4 is connected to the base electrode of a transistor Q2. A junction Vp of the resistors R3–R4 is returned to ground by way of a capacitor C1. Also connected to the junction Vp of the resistors R3–R4 is the collector electrode of a transistor Q3 having the emitter electrode returned to ground and the base electrode connected to the capacitor C1 through a resistor R5.

The output terminal 6p of the DC-to-DC converter 6n is coupled to the power terminal 2f of the transmitter power amplifier 2b in the RF transmitter/receiver section 2 to supply the power supply voltage −V thereto. Also, a resistor R6 is connected between the output terminal 6p of the DC-to-DC converter 6n and one end of the resistor R5.

Connected to a power supply Vcc are one end of a resistor R1 and the emitter electrode of a control transistor Q4 while connecting the other end of the resistor R1 to one end of a resistor R2 and the base electrode of the control transistor Q4. The other end of the resistor R2 is then connected with the collector electrode of the transistor Q1. The collector electrode of the control transistor Q4 is connected with the power terminal 2a of the RF transmitter/receiver section 2.

FIG. 3 shows a voltage waveform at the junction Vp of the resistors R3–R5 when the regulator 6e in FIG. 2 turns on. The operation of the control circuit 6 will be described hereunder by reference to FIGS. 2 and 3.

Firstly, when the carrier wave enabling signal 4 precedes the modulation start signal 5, the operation is as follows: In the time duration when only the carrier wave enabling signal 4 is generated, the regulator 6e and the DC-to-DC converter 6n do not operate even if the carrier wave enabling signal 4 is applied from the input terminal 6a, thereby maintaining the transistor Q2 nonconductive. As a result, the transistor Q1 does not become conductive and the control transistor Q4 remains nonconductive. The RF transmitter/receiver section 2 is not connected to the power supply Vcc, thereby de-energizing the RF transmitter/receiver section 2 and the transmitter power amplifier 2b.

In an event that the modulation start signal 5 is supplied from the input terminal 6b subsequent to application of the carrier wave enabling signal 4 to the input terminal 6a, the regulator 6e operates at that timing and provides the DC output voltage +V on the output terminal 6g. The DC voltage +V from the output terminal 6g is, then, applied to the base electrode of the transistor Q2 by way of the resistors R3–R4 and also to the base electrode of the transistor Q3 by way of the resistors R3–R5. Simultaneously, the DC voltage +V from the regulator 6e is applied to the input terminal 6o of the DC-to-DC converter 6n.

It is to be noted that the capacitor C1 is connected to the junction Vp of the resistors R3–R5 and ground and that the DC-to-DC converter 6n is not generating the output voltage −V, at its output terminal 6p. Accordingly, the potential at the junction Vp rises with the time constant of the resistor R3 and the capacitor C1. When the potential at the junction Vp reaches a certain level, the transistor Q3 turns on, thereby bringing the voltage at the junction of the resistors R3–R5 close to the ground level.

In the meantime, the DC-to-DC converter 6n establishes its output voltage −V at the output terminal 6p so as to energize the power amplifier 2b by supplying the power thereto. At this time, the voltage level at the junction Vp is equal to the potential difference of the output voltage +V from the regulator 6e and the output voltage −V from the DC-to-DC converter 6n divided by the resistors R3 and R6, or given by the following expression:

[Resistance of the Resistor R6×{(+V)−(−V)}]/[(Resistance of the Resistor R3+Resistance of the Resistor R6)]

This voltage level is sufficient to maintain the transistor Q3 nonconductive.

As a result, the transistor Q3 remains conductive only for the time duration T as shown in FIG. 3, thereby controlling the transistor Q2 to nonconductive and then conductive after the time duration T. Since the carrier wave enabling signal 4 is already on, the transistor Q4 becomes conductive as soon as the transistor Q2 turns on and energizes the RF transmitter/receiver section 2 by supplying the power supply voltage Vcc.

In summary, even if the carrier wave is generated in advance and the carrier wave enabling signal 4 is generated prior to the modulation start signal 5, the RF transmitter/receiver section 2 and the transmitter power amplifier 2b are not energized yet at that time, thereby not transmitting from the RF transmitter/receiver section 2 and the antenna 1 the carrier wave which is not modulated by the digital data signal.

In an event that the carrier wave enabling signal 4 occurs simultaneously with the modulation start signal 5, the RF transmitter/receiver section 2 and the transmitter power amplifier 2b do not start operation until the time duration T after generation of the modulation start signal 5 as described herein before. This ensures that unmodulated carrier wave is not transmitted from the RF transmitter/receiver section 2 and the antenna 1 prior to completion of modulation.

What is claimed is:

1. A wireless communication system including at least a signal processing circuit section and a high frequency transmitter/receiver section for transmitting and receiving a carrier wave modulated by an audio or digital data signal, characterized in the provision of a control circuit for controlling the operation of said high frequency transmitter/receiver section by controlling the completion timing of modulation at least by the digital data signal with respect to the transmission timing of the modulated carrier wave from a power amplifier in said high frequency transmitter/receiver section such that transmitting of the carrier wave is delayed until said modulation by the digital data signal is effected, wherein said control circuit comprises a circuit to supply a power supply voltage to said high frequency transmitter/receiver selection and a time constant circuit to operate on the completion timing of modulation, thereby initiating the operation of said circuit to supply the power supply voltage at the timing delayed by a given time of said time constant circuit.

* * * * *